Patented Dec. 21, 1926.

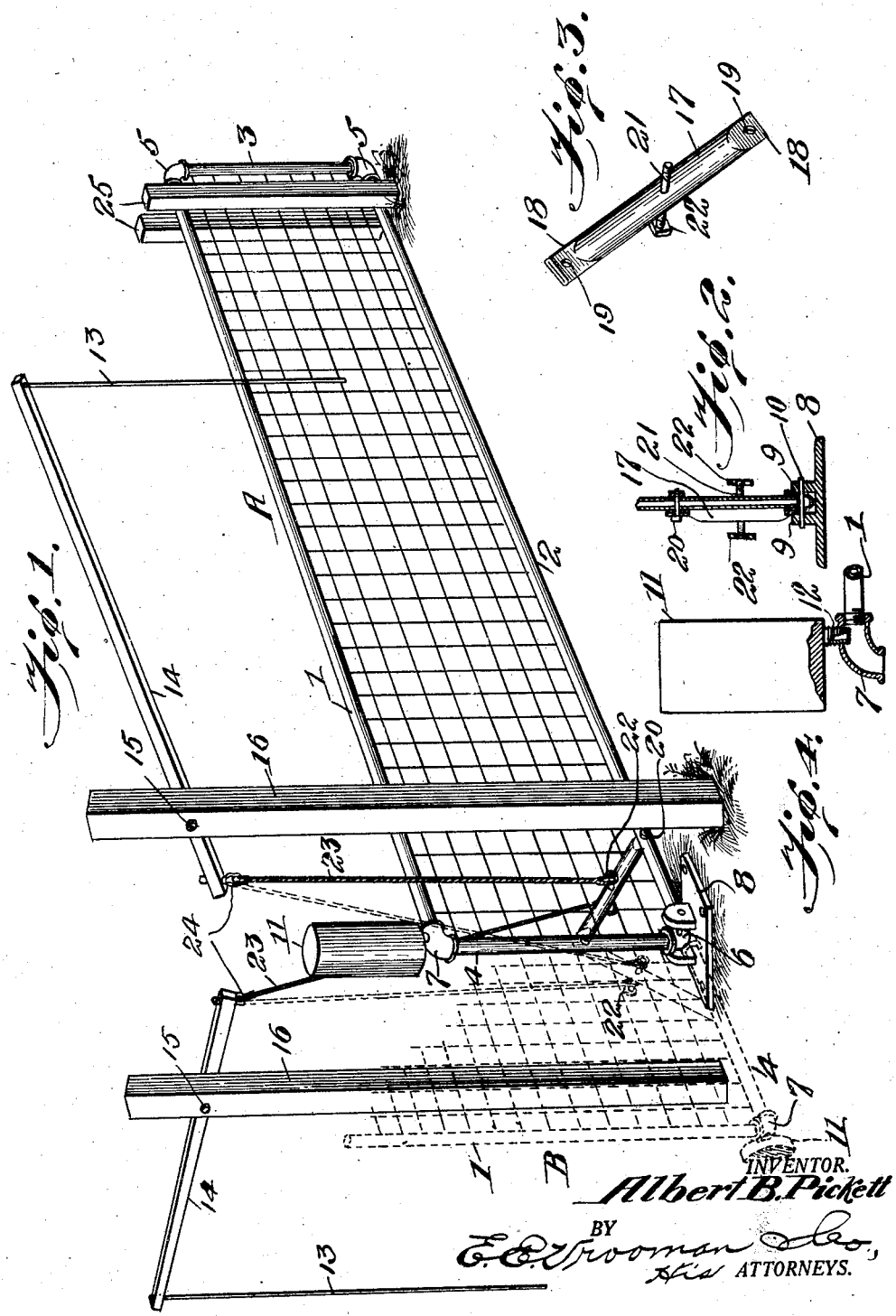

1,611,367

UNITED STATES PATENT OFFICE.

ALBERT B. PICKETT, OF LOS GATOS, CALIFORNIA.

TILTING GATE.

Application filed May 6, 1926. Serial No. 107,164.

This invention relates to improvements in tilting gates.

The object of the invention is the construction of a simple and efficient tilting gate, which can be quickly and easily operated from either side of the gate.

This invention relates to certain improvements made upon the structure as disclosed in my prior United States Patent No. 923,884, issued June 8, 1909.

With the foregoing and other objects in view, my invention comprises certain novel constructions combinations and arrangements of parts as will be hereinafter fully described, illustrated in the accompanying drawings, and more particularly pointed out in the appended claims.

In the drawings:

Figure 1 is a perspective view of the improved gate and its operating mechanism, the gate being shown in a closed position.

Figure 2 is a detail view, partly in section of the rear end of the gate, showing its pivotal support and also its connection with the lifting mechanism.

Figure 3 is a detail view of the brace member of the gate frame, with which the lifting mechanism connects.

Figure 4 is a view partly in section and partly in elevation of the elbow and cylindrical weight attached thereto.

Referring to the drawings by numerals, the gate in its entirety has been designated by the letter "A", the same comprising the top member 1, a bottom member 2 and end members 3 and 4, said ends and top and bottom members being preferably formed of piping, the end or side member 3 being connected to the top and bottom members by elbow couplings 5. The end member 4 is connected to horizontal members 1 and 2 by means of elbow couplings 6 and 7.

A supporting plate 8 is provided, which plate is furnished with parallel lugs 9, and extending through elbow coupling 6 and lugs 9 is a pin 10, constituting the pivot for the gate "A".

A cylindrical weight 11 is provided on its bottom with a concentrically positioned depending integral threaded tit 12, which tit 12, which is threaded into the elbow coupling 7 (Fig. 4). This heavy weight, by reason of its peculiar mounting on elbow coupling 7 very easily tilts or throws the gate to its open, upright position (not shown) when the person operating the gate has given a slight downward pull upon member 13. These members 13 may be made of any suitable material such as rope, wire or rods.

The members 13 are attached at their upper ends to lever arms 14. Lever arms 14 are pivotally mounted at 15 upon posts 16. These posts 16 are positioned at opposite sides of plate 8.

A pipe brace 17 is used; this brace 17 has its ends 18 flattened, and in these flattened ends are formed apertures 19. These flattened ends 18 are laid against the sides of horizontal member 2 and vertical member 4, and bolts 20 are passed through apertures 19 and the members 2 and 4, securely fastening the brace in position on the gate. This is a very simple and efficient structure. A pin 21 extends through the central part of the pipe brace 17 and on its threaded ends are nuts 22. Lifting cables 23 are connected at their lower ends to pin 21 between the nuts 22, and their upper ends are fastened to the eye bolts 24, which bolts are fastened to the inner ends of the lever arms 14.

When the gate is in the closed position shown in the drawing, its outer end, constituted by member 3 and part of members 1 and 2 is between the parallel posts 25, but the gate is free to move vertically, on pivot 10 to the dotted position "B", Fig. 1.

To open or close the gate, all the operator has to do is to pull down on a member 13 and the gate will be swung upon its pivot to the desired position, the weight 11 acting in an efficient manner to facilitate the movement of the gate to either an open or a closed position.

For any additional information with reference to this particular type of a tilting gate, one may refer to my prior Patent No. 923,884, hereinbefore mentioned.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. A tilting gate, comprising a base plate, a gate frame having one lower corner hinged thereto, said gate frame provided with an elbow coupling carried by an upper corner directly above the lower hinged corner, said elbow coupling provided with a vertically threaded aperture in its top, an elongated weight provided off center in its bottom near its edge with a depending threaded tit, said tit threaded vertically into said aperture in the top of said elbow coupling, and means for tilting said gate frame.

2. In a tilting gate, the combination with a supporting plate, of a gate frame pivotally mounted upon said supporting plate, said gate frame provided with an elbow coupling, an elongated weight provided on its bottom and near one edge with a depending threaded tit, said tit threaded into said elbow coupling between its ends, and means for tilting the gate frame.

In testimony whereof I hereunto affix my signature.

ALBERT B. PICKETT.